(12) United States Patent
Mohanty et al.

(10) Patent No.: US 9,397,931 B1
(45) Date of Patent: Jul. 19, 2016

(54) FAST CONVERGENCE IN SINGLY-HOMED ETHERNET VIRTUAL PRIVATE NETWORKS

(71) Applicant: Juniper Networks, Inc., Sunnyvale, CA (US)

(72) Inventors: Satya Ranjan Mohanty, Sunnyvale, CA (US); John E. Drake, Pittsburgh, PA (US); Manish Gupta, Santa Clara, CA (US); Nadeem Mohammad, Wilmington, MA (US); Wen Lin, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 212 days.

(21) Appl. No.: 13/969,226

(22) Filed: Aug. 16, 2013

(51) Int. Cl.
| | |
|---|---|
| *H04L 12/703* | (2013.01) |
| *H04L 12/753* | (2013.01) |
| *H04L 12/721* | (2013.01) |
| *H04L 12/707* | (2013.01) |
| *H04L 12/46* | (2006.01) |

(52) U.S. Cl.
CPC ............ *H04L 45/28* (2013.01); *H04L 12/4625* (2013.01); *H04L 45/44* (2013.01); *H04L 45/48* (2013.01); *H04L 45/22* (2013.01)

(58) Field of Classification Search
CPC ... H04L 12/4625; H04L 12/4633; H04L 1/22; H04L 41/0677; H04L 45/04; H04L 45/22; H04L 45/28; H04L 45/44; H04L 45/48; H04L 45/50; H04L 45/66
See application file for complete search history.

(56) References Cited

U.S. PATENT DOCUMENTS

| | | | |
|---|---|---|---|
| 8,125,926 B1 | 2/2012 | Kompella | |
| 8,593,973 B2 | 11/2013 | Shukla et al. | |
| 8,644,134 B2 | 2/2014 | Sajassi et al. | |
| 8,811,181 B2 | 8/2014 | Osswald | |
| 8,953,590 B1 * | 2/2015 | Aggarwal et al. ............. | 370/389 |
| 2011/0286452 A1 | 11/2011 | Balus et al. | |
| 2012/0147737 A1 | 6/2012 | Taylor et al. | |

(Continued)

OTHER PUBLICATIONS

Aggarwal et al, "BGP MPLS Based Ethernet VPN," Network Working Group Internet Draft, draft-raggarwa-sajassi-l2vpn-evpn-04, Sep. 12, 2011, 42 pp.

(Continued)

*Primary Examiner* — Ayaz Sheikh
*Assistant Examiner* — Debebe Asefa
(74) *Attorney, Agent, or Firm* — Shumaker & Sieffert, P.A.

(57) ABSTRACT

In general, techniques are described for performing a mass withdrawal of media access control (MAC) addresses using a reduced number of route withdrawal messages within a singly-homed segment of an Ethernet Virtual Private Network (EVPN). The techniques may include determining a segment identifier of the segment and sending a route advertisement to advertise a route for the segment identifier to a provider edge network device. The techniques may include sending a route advertisement to advertise one or more media access control (MAC) routes for the layer two segment. The techniques may also include, responsive to determining a link failure between a first provider edge network device and a customer edge network device, sending a withdrawal message to the second provider edge network device for the route associated with the segment identifier to withdraw all of the plurality of MAC routes at the second provider edge network device.

21 Claims, 5 Drawing Sheets

(56) References Cited

U.S. PATENT DOCUMENTS

2012/0236750 A1    9/2012  Bugenhagen et al.
2013/0235876 A1*   9/2013  Sajassi et al. ............... 370/401
2013/0254359 A1*   9/2013  Boutros et al. .............. 709/223
2014/0029419 A1    1/2014  Jain et al.
2014/0241247 A1    8/2014  Kempf et al.

OTHER PUBLICATIONS

Rosen et al, "BGP/MPLS VPNs," RFC 2547, Network Working Group, The Internet Society, Mar. 1999, 25 pp.

Sajassi et al, "BGP MPLS Based Ethernet VPN," Network Working Group Internet Draft, draft-ietf-12vpn-evpn-01, Jul. 14, 2012, 43 pp.

* cited by examiner

FAST CONVERGENCE IN SINGLY-HOMED ETHERNET VIRTUAL PRIVATE NETWORKS

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

As a PE network device in an EVPN forwards Ethernet frames, the PE network devices learn L2 state information for the L2 customer networks. The L2 state information may include media access control (MAC) addressing information for the CE network devices and customer equipment within the customer network and the physical ports of the PE network device through which the customer devices are reachable. The PE network devices typically store the MAC addressing information in L2 learning tables associated with each of their physical interfaces. When switching an individual Ethernet frame having a given destination MAC address, a PE network device typically broadcasts the Ethernet frame to all of its physical ports unless the PE network device has previously learned the specific physical port through which to the destination MAC address is reachable. In this case, the PE network device forwards a single copy of the Ethernet frame out the associated physical port.

In an EVPN, MAC learning between PE network devices occurs in the control plane rather than in the data plane (as happens with traditional bridging) using a routing protocol. For example, in EVPNs, a PE network device typically uses the Border Gateway Protocol (BGP) (i.e., an L3 routing protocol) to advertise to other provider edge network devices the MAC addresses learned from the local consumer edge network devices to which the PE network device is connected. A PE device may use BGP route advertisement message to announce reachability information for the EVPN, where the BGP route advertisement specifies one or more MAC addresses learned by the PE network device instead of L3 routing information.

In some configurations, when a link failure or other topology event occurs within an EVPN, the PE network device may send BGP withdrawal messages to other PE network devices to indicate that the PE network device is no longer able to forward network traffic for the particular MAC addresses previously associated with the link that has now failed. Consequently, in the case of network topologies in which a PE router has learned thousands or potentially millions of MAC addresses for a customer network, failure of a network link may cause the PE network device to send a significant number of withdrawal messages to neighboring PE network devices so as to withdraw each individual MAC address. This may, in turn, result in a high volume of control plane messages traversing the intermediate network of the EVPN and yield suboptimal convergence times after the link failure or other topology change.

SUMMARY

Techniques described herein that enable a router within a singly-homed segment of an Ethernet Virtual Private Network (EVPN) to perform a mass withdrawal of media access control (MAC) addresses using a reduced number of route withdrawal messages. In some example implementations, the techniques may enable the router to perform the mass withdrawal of MAC addresses using a single withdraw message of a layer three (L3) routing protocol.

In accordance with techniques of the disclosure, an EVPN may include a first PE network device that provides singly-homed connectivity for a customer edge (CE) network device an Ethernet segment of an EVPN for a customer, where the EVPN includes multiple Ethernet segments for the customer. While forwarding L2 traffic for the Ethernet segment, the first PE network device performs MAC learning with respect to MAC addresses in the Ethernet segment for network devices and/or customer equipment reachable by the CE network device. Within an MPLS core associated with the EVPN, the first PE network device may issue routing protocol advertisements (referred to as "MAC routes") to advertise the MAC addresses to a second PE network device associated with the EVPN and separately advertise a route for the Ethernet segment. That is, the first PE network device of the singly-homed Ethernet segment may also issue to the second PE network device a separate route advertisement (e.g., an Auto-Discovery (AD) route) that contains a segment identifier of the Ethernet segment. In this way, the second PE network device may determine that the MAC routes are associated with the Ethernet segment identified by the segment identifier.

In some examples, the first PE network device may experience a link failure or other impediment to network communication, for example, between the first PE network device and the CE network device. In such instances, the CE network device may not be reachable via the network link between the first PE network device and a CE network device. Therefore network traffic sent by the second PE network device to the first PE device en route to the CE network device may be dropped at the first PE device. In accordance with techniques of the disclosure, rather than sending separate control plane messages to withdrawal each respective MAC route from the MAC routing table of the second PE network device, the first PE network device may send a single withdrawal message for the route associated with the segment identifier. The second PE network device may use the segment identifier to withdraw all MAC routes associated with the Ethernet segment that is identified by the segment identifier and update next hops for network traffic destined to the CE network device, thereby flushing the MAC addresses at the second PE network device that were identified as reachable by the first PE network device. By separately sending a single route withdrawal message for the route associated with the Ethernet segment as a whole, even though the Ethernet segment is a singly-homed segment having only a single local PE network device (i.e., the first PE network device), the techniques of the disclosure may reduce the number of control plane messages that the first PE device sends to the second PE device to withdraw the MAC routes in the event of a link failure in a singly-homed L2 segment. Moreover, the techniques of the disclosure may provide for improved convergence times when re-routing network traffic in response to a link failure.

In one example, a method includes determining, by a first provider edge network device to which a customer edge network device is singly-homed in a layer two segment of an Ethernet Virtual Private Network (EVPN), a segment identifier of the layer two segment. The method may also include sending, by the first provider edge network device and using a layer three (L3) routing protocol, a route advertisement to advertise a route for the segment identifier to a second provider edge network device included in the EVPN. The method may also include sending, by the first provider edge network device and to the second provider edge network device using the layer three L3 routing protocol, a route advertisement to advertise one or more media access control (MAC) routes for the layer two segment, wherein each of the MAC routes specifies at least one MAC address reachable through the customer edge network that is singly-homed to the first provider edge network device. The method may also include, responsive to determining a link failure between the first provider edge network device and the customer edge network device, sending, by the first provider edge network device and using the L3 routing protocol, a withdrawal message to the second provider edge network device for the route associated with the segment identifier to withdraw all of the plurality of MAC routes at the second provider edge network device, wherein the segment identifier corresponds to the one or more MAC routes maintained by the second provider edge network device that were previously learned by the first provider edge router.

In one example, a network device is a first provider edge network device, and the method includes an Ethernet Virtual Private Network (EVPN) module that determines, by the first provider edge network device to which a customer edge network device is singly-homed in a layer two segment of an EVPN, a segment identifier of the layer two segment. The EVPN module may send, using a layer three (L3) routing protocol, a route advertisement to advertise a route for the segment identifier to a second provider edge network device included in the EVPN. The EVPN module may send, to the second provider edge network device using the layer three L3 routing protocol, a route advertisement to advertise one or more media access control (MAC) routes for the layer two segment, wherein each of the MAC routes specifies at least one MAC address reachable through the customer edge network that is singly-homed to the provider edge network device. The EVPN module may, responsive to determining a link failure between the first provider edge network device and the customer edge network device, sends, using the layer three L3 routing protocol, a withdrawal message to the second provider edge network device for the route associated with the segment identifier to withdraw all of the plurality of MAC routes at the second provider edge network device. The segment identifier may correspond to the one or more MAC routes maintained by the second provider edge network device that were previously learned by the first provider edge router.

In one example, a method includes receiving, by a first provider edge network device and from a second provider edge network device to which a customer edge network device is singly-homed in a layer two segment of an Ethernet Virtual Private Network (EVPN), a layer 3 (L3) route advertisement that advertises a route that indicates the second provider edge network device is reachable in the layer 2 segment identified by a segment identifier. The method may include receiving, by the first provider edge network device and from the second provider edge network device, a L3 route advertisement that advertises a media access control (MAC) route for the layer two segment, wherein the MAC routes specifies a MAC address reachable through the customer edge network that is singly-homed to the second provider edge network device. The method may include updating, by the first provider edge network device, forwarding information of the first provider edge network device to associate the MAC route with the segment identifier. The method may include, responsive to receiving, by the first provider edge network device and from the second provider edge network device, a L3 route withdrawal message that indicates the segment identifier, flushing, by the first provider edge network device, all MAC routes at the first provider edge network device associated with the segment identifier. The segment identifier may correspond to MAC routes maintained by the first provider edge network device that were previously learned by the second provider edge router.

In one example, a network device is a first provider edge network device, which may include an Ethernet Virtual Private Network (EVPN) module that receives, from a second provider edge network device to which a customer edge network device is singly-homed in a layer two segment of an EVPN, a layer 3 (L3) route advertisement that advertises a route that indicates the second provider edge network device is reachable in the layer 2 segment identified by a segment identifier. The EVPN module may receive, from the second provider edge network device, a L3 route advertisement that advertises a media access control (MAC) route for the layer two segment, wherein the MAC routes specifies a MAC address reachable through the customer edge network that is singly-homed to the second provider edge network device. The EVPN module may update forwarding information of the first provider edge network device to associate the MAC route with the segment identifier. The EVPN module, responsive to receiving from the second provider edge network device a L3 route withdrawal message that indicates the segment identifier, may flush all MAC routes at the first provider edge network device associated with the segment identifier, wherein the segment identifier corresponds to MAC routes maintained by the first provider edge network device that were previously learned by the second provider edge router.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
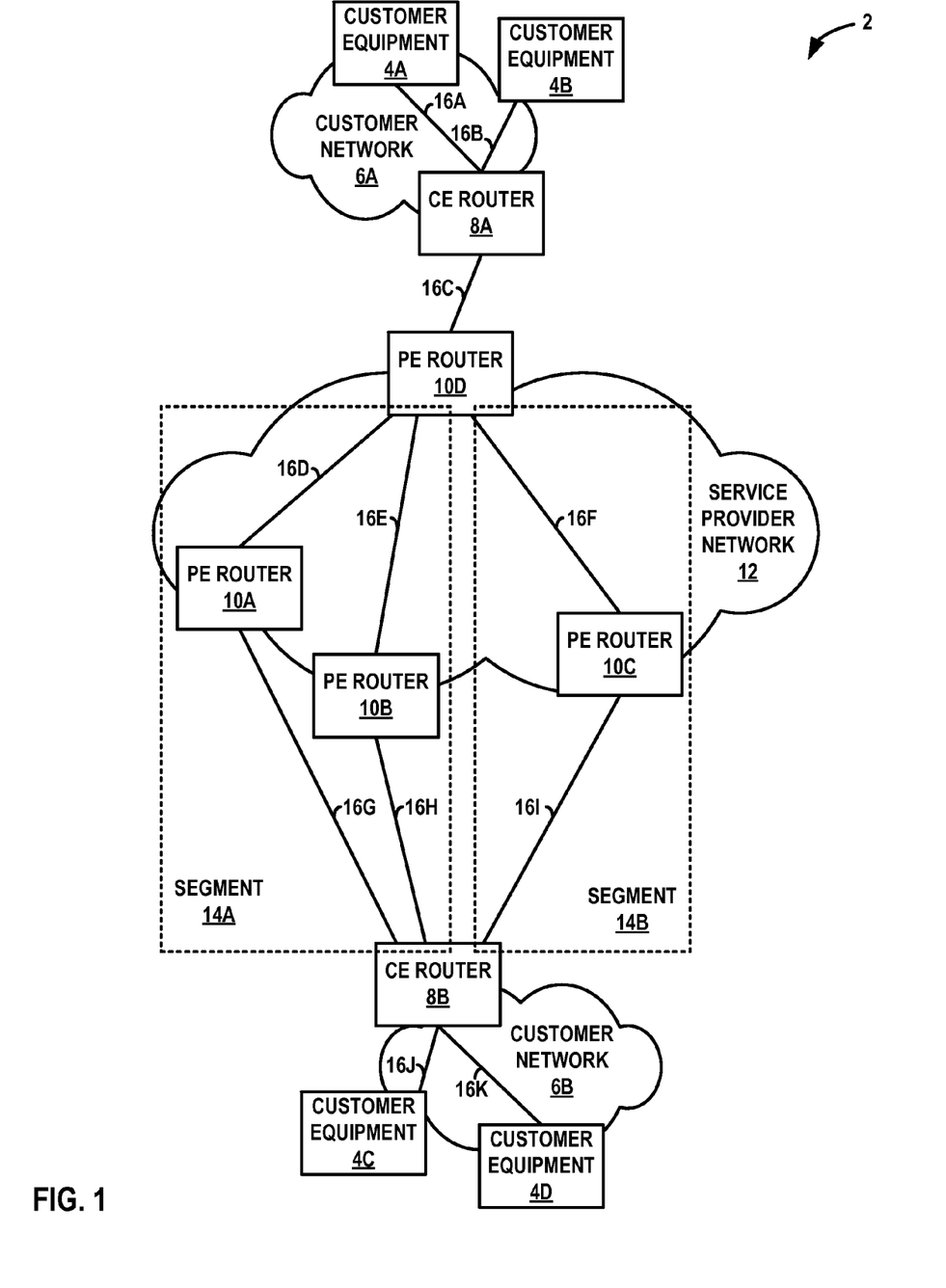
FIG. 1 is a block diagram illustrating an example system in which a first provider edge (PE) router uses a single route withdrawal message to perform a mass withdrawal of Media Access Control (MAC) routes in a second PE router of a singly-homed L2 segment in an EVPN, in accordance with techniques of the disclosure.

FIG. 1 is a block diagram illustrating an example system 2 in which provider edge (PE) router 10C uses a single route withdrawal message to perform a mass withdrawal of Media Access Control (MAC) routes in a PE router 10D of a singly-homed L2 segment in an EVPN, in accordance with techniques of the disclosure. In the example of FIG. 1, PE routers 10A-10D ("PE routers 10") provide customer devices 4A-4D ("customer devices 4") associated with customer networks 6A-6B ("customer networks 6") with access to service provider network 12 via CE routers 8A-8B ("CE routers 8"). Network links 16A-16I may be Ethernet, ATM or any other suitable network connections.

PE routers 8 and CE routers 10 are illustrated as routers in the example of FIG. 1; however, techniques of the disclosure may be implemented using switches or other suitable network devices. Customer networks 6 may be networks for geographically separated sites of an enterprise. Each of customer networks 6 may include additional customer equipment 4A-4D ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 represents a publically accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. Service provider network 12 may include a variety of network devices other than PE routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes Ethernet Virtual Private Network (EVPN). EVPN is a service that provides a form of L2 connectivity across an intermediate network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In the example of FIG. 1, the network operator configures each of PE routers 10 to provision LSPs. Other alternative technologies to LSPs may also be used such as pseudowires.

Although not shown in FIG. 1, EVPN may operate over such LSPs to enable a logical form of L2 connectivity. LSPs are logical network connections that emulate a connection not natively offered by service provider network 12 for consumption outside the boundaries of that service provider network 12. LSPs may emulate a L2 connection within service provider network 12 enabling service provider network 12 to offer emulated L2 connectivity externally for consumption by L2 customer networks 6 as EVPN.

To configure EVPN, LSPs may be configured such that each of PE routers 10 that provide EVPN for consumption by the subscribing entity is interconnected by way of LSPs to every other one of the PE devices that provide EVPN for consumption by the subscribing entity. In the example of FIG. 1, each of PE routers 10 provides access to the EVPN for carrying traffic associated with customer networks 6 and, therefore, each of PE devices 10 within the same Ethernet segment may be connected to every other PE device 10 via LSPs. Once LSPs are configured in this manner, EVPN may be enabled within PE devices 10 to operate over the LSPs, which may in this context operate as logical dedicated links through service provider network 12. In operation, EVPN generally involves prepending or otherwise inserting a tag and a label onto incoming L2 packets, which may also be referred to as L2 frames (particularly in the context of Ethernet), and transmitting the tagged packets through a corresponding one of the configured LSPs. Once EVPN is configured within service provider network 12, customer devices 4 within customer networks 6 may communicate with one another via EVPN as if they were directly connected L2 networks.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including media access control (MAC) addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 of system 2, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of a customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN.

In this way, PE routers 10 may perform both local learning and remote learning of MAC addresses. Each of PE routers 10 (e.g., PE router 10C) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determines whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two physically different PE routers on the same ESI when the PE routers are resident on the same physical Ethernet Segment. As one example, CE router 8B is coupled to PE routers 10A and 10B via links 16G and 16H, respectively, where PE routers 10A and 10B are capable of providing access to EVPN for L2 customer network 6B via CE router 8B. CE router 8B is also coupled to PE router 10C via link 16I, where PE router 10C is capable of providing access to EVPN also for L2 customer network 6B via CE router 8B. In instances where a given network may couple via two different and, to a certain extent, redundant links, the network may be referred to as being "multi-homed." In this example, CE router 8B may be multi-homed to PE routers 10A and 10B that because CE router 8B is coupled to two different PE routers 10A, 10B via separate and, to a certain extent, redundant links 16AB 16H, where both of PE routers 10A, 10B are capable of providing access to EVPN for L2 customer network 6B. Multi-homed networks are often employed by network operators so as to improve access to EVPN provided by service provider network 12 should a failure in one of links 16G, 16H occur.

If a CE network device, such as CE router 8B, is multi-homed to two or more PE network devices, the set of L2 links and PE routers constitutes an "Ethernet Segment". For instance, PE routers 10A-10B are included in Ethernet segment 14A. An Ethernet Segment may appear to the CE network device as a Link Aggregation Group (LAG). Ethernet segments have an identifier, called the "Ethernet Segment Identifier" (ESI), which may be encoded as a ten octets integer. In general, an Ethernet segment uses a non-reserved ESI that is unique network wide (e.g., across all EVPNs on all the PEs). In some examples, a network operator may manage ESIs throughout the EVPN to ensure unique network wide ESIs for respective Ethernet segments. In other examples, ESIs may be allocated automatically. In this example of FIG. 1, Ethernet segment 14A includes PE routers 10A-10B, 10D and CE router 8B, and Ethernet segment 14A may be associated with a unique ESI.

Using ESIs, PE routers 10 may share learned MAC addresses by sending MAC Advertisement routes that specify, among other information, a learned MAC address and a corresponding ESI for which the MAC address is applicable. In this way, PE routers may maintain tables of MAC addresses associated with corresponding ESIs, where each ESI effectively defines a layer two (L2) domain in which the respective MAC addresses are valid. Consequently, a PE router that receives and maintains MAC addresses that were previously learned by other PE routers can determine that a MAC route is accessible through multiple PE routers that are associated with the same ESI.

As shown in FIG. 1, CE router 8B is also coupled to PE router 10C via link 16I, where PE router 10C provides access to EVPN for L2 customer network 6B via CE router 8B. In this configuration, CE router 8B is singly-homed to PE router 10C in that it does not feature different and, to a certain extent, redundant connections to EVPN provided by service provider network 12. In other words, only a single PE router 10C provides connectivity to the EVPN.

As described above, PE routers 10 may use control plane signaling with different route types to provision the EVPN service in service provider network 12. EVPN defines BGP Network Layer Reachability Information (NLRI), and in particular, defines different route types. The EVPN NLRI is carried in BGP using BGP Multiprotocol Extensions. Route types include but are not limited to: Ethernet Auto-Discovery (AD) routes, MAC advertisement routes, and Ethernet Segment Routes. AD routes, for example, specify a Route Distinguisher (RD) (e.g., an IP address of an MPLS Edge Switch (MES)), ESI, Ethernet Tag Identifier, and MPLS label. MAC advertisement routes include a RD, ESI, Ethernet Tag Identifier, MAC address and MAC address length, IP address and IP address length, and MPLS label. An Ethernet Segment route includes a Route Distinguisher and Ethernet Segment Identifier.

PE routers 10 and CE routers 8 may share NLRI to configure one or more Ethernet Segments and share MAC routes that are learned by the respective devices. In general, multiple PE routers connected to the same Ethernet segment (i.e., a multi-homed Ethernet segment) can automatically discover each other with minimal to no configuration through the exchange of the Ethernet Segment route using BGP. In multi-homed environments, EVPN defines a mechanism to signal, to remote PE routers, the need to update their forwarding tables upon the occurrence of a failure in connectivity to an Ethernet segment. This is done by having each of the plurality of PE routers of the multi-homed Ethernet segment advertise an Ethernet AD Route per Ethernet segment for each locally attached segment. Upon a failure in connectivity to the attached segment, the PE router withdraws the corresponding Ethernet AD route by sending an AD route withdrawal message to other PE routers. This triggers all PE routers that receive the withdrawal to update their next-hop adjacencies for all MAC addresses associated with the Ethernet segment specified by the Ethernet AD route. If no other PE routers had advertised an Ethernet AD route for the same segment, then the PE router that received the withdrawal simply invalidates the MAC entries for that segment. Otherwise, the PE router updates the next-hop adjacencies to point to a PE router that was initially configured as a backup PE network device in the Ethernet Segment.

In the case of link or port failure in a multi-homed environment, the affected PE router withdraws its Ethernet Segment route by sending the AD route withdrawal message to other PE routers. The control plane messages trigger a MAC address flush notification at the receiving PE routers. For instance, if a PE router 10B encounters a failure, it withdraws its Ethernet AD route for the affected by sending an AD route withdrawal message to PE routers 10A and 10D in segment 14A. In the case where a backup PE router (e.g., PE router 10A) in the network had advertised an Ethernet AD route for the same ESI, the other, remote PE routers (e.g., PE router 10D) can then use the Ethernet AD route withdrawal as a trigger to update their forwarding entries, for the associated MAC addresses, to point towards the backup PE router (e.g., PE router 10A). Therefore, when PE router 10D receives an AD route withdrawal from PE router 10B, PE router 10D can switch next hopes of all L2 prefixes associated with the AD route withdrawal received from PE router 10B to forward network traffic to PE router 10A, which is included in the same Ethernet segment. As the backup PE router (e.g., PE router 10A) starts learning the MAC addresses over its attached Ethernet segment, it will start sending MAC Advertisement routes while the failed PE router (e.g., PE router 10B) withdraws its own.

Although the aforementioned techniques illustrate fast convergence using AD routes in a multi-homed configuration, the current EVPN specification ("BGP MPLS Based Ethernet VP", draft-ietf-l2vpn-evpn-03, Feburary 25, 2013) does not does provide for such techniques to perform efficient mass withdrawal of MAC addresses in singly-homed configurations. For instance, under the current EVPN specification, an ESI is not defined for a singly-homed configuration, such as PE router 10C and CE router 8B. In the event of a link failure at link 16I, PE router 10C would be required to send individual MAC route withdrawal messages using BGP to PE router 10D on a per MAC route basis under the current EVPN specification. If PE router 10D maintains thousands or millions of MAC addresses that were previously learned by PE router 10C and shared with PE router 10D, then PE router 10C may be required to send a large number of MAC route withdrawal messages. Since BGP withdraws are subject to network constraints, CPU and memory processing, route reflectors and sink points, sending individual MAC route withdrawal messages using BGP may result in suboptimal amounts of control plane messaging and times required for network convergence in the event of a link failure.

In accordance with techniques of the present disclosure, PE router 10C may be configured with a unique ESI, although it is singly-homed and, therefore, not considered part of an Ethernet segment. By configuring PE router 10C with a unique ESI in the EVPN, PE router 10C may be included in Ethernet segment 14B that is different from Ethernet segment 14A. As PE router 10C performs MAC learning and sends MAC route advertisements to PE router 10D, PE router 10D maintains the ESI of Ethernet 14B that associated with the MAC addresses specified in the MAC route advertisements. Moreover, PE router 10C and PE router 10D configure an AD route that corresponds to Ethernet segment 14B identified by the ESI. In the event of a link failure (e.g., at network link 16I), rather than PE router 10C sending individual MAC route withdrawal messages to PE router 10D on a per MAC route basis, PE router 10C may send a single AD route withdrawal message to PE router 10D, which specifies the ESI corresponding to segment 14B. Because PE router 10D maintains the ESI associated with the MAC routes received from PE router 10C in the singly-homed configuration, PE router 10D can perform a mass withdraw of all MAC addresses corresponding to the ESI specified in the AD route withdrawal message. In some instances, PE router 10D may update next hops for the L2 prefixes of MAC addresses identified by the ESI in the AD route withdrawal message. By assigning PE router 10C an ESI although it is not multi-homed in the EVPN, techniques of the disclosure enable PE router 10C to perform a single NLRI exchange (e.g., send a single AD route withdrawal message) to PE router 10D in the event of a link failure thereby decreasing the number of control plane messages and improving the network convergence time.

In some examples, since a MAC address associated with, for example, customer equipment 4C is no longer reachable using Ethernet segment 14B, PE router 10D may not send packets to PE router 10C after receiving the AD route withdrawal message because PE router 10C may discard such packets, or flood such packets, which may result in additional network traffic that serves no purpose. Rather, in such examples, if PE router 10D receives a packet from CE router 8A and does not know behind which of PE routers 10A-10C that the packet's destination MAC address is located, PE router 10D may discard the packet.

In operation, PE router 10C, at the time of initial configuration and startup, determines an ESI that identifies Ethernet segment 14B, although PE router 10C is singly-homed to CE router 8B. PE router 10C uses BGP to send an AD route advertisement to PE router 10D to advertise a route for the ESI that identifies Ethernet segment 14B. In this way, PE router 10D becomes aware of Ethernet Segment 14B that includes PE router 10C and CE router 8B. As PE router 10C receives network traffic from CE router 8B, PE router 10C may perform MAC learning to determine MAC addresses corresponding to, for example, CE router 8B and customer equipment 4C-4D. PE router 10C may send routing protocol messages, such as MAC route advertisements to advertise MAC routes for Ethernet segment 14B. A MAC route advertisement may include the ESI that identifies Ethernet segment 14B and the MAC address that was learned by PE router 10C.

PE router 10D may receive the MAC route advertisements from PE router 10C and maintain the information indicated in the MAC route advertisements in a MAC table. The MAC table may indicate associations between MAC addresses and respective ESIs associated with the MAC addresses. At a later point in time, PE router 10C may determine a link failure at network link 16I between PE router 10C and CE router 8B. In accordance with techniques of the disclosure, responsive to determining the link failure, PE router 10C may send an AD route withdrawal message via BGP to PE router 10D. The AD route withdrawal message includes the ESI associated with Ethernet segment 14B. PE router 10D may receive the AD route withdrawal message and perform a mass withdraw all of the MAC addresses maintained in its MAC table that correspond to MAC routes associated with the ESI indicated in the AD route withdrawal message. In this way, PE router 10C upon determining a network link failure, can send a single AD route withdrawal message rather multiple, separate per-MAC route withdrawal messages to withdraw all of the MAC routes that are no longer reachable in Ethernet segment 14B due to the link failure of network link 16I. Consequently, techniques of the disclosure implemented in PE router 10C may reduce the number of control plane messages and/or improve network convergence times in the event of a link failure.

Figure 2:
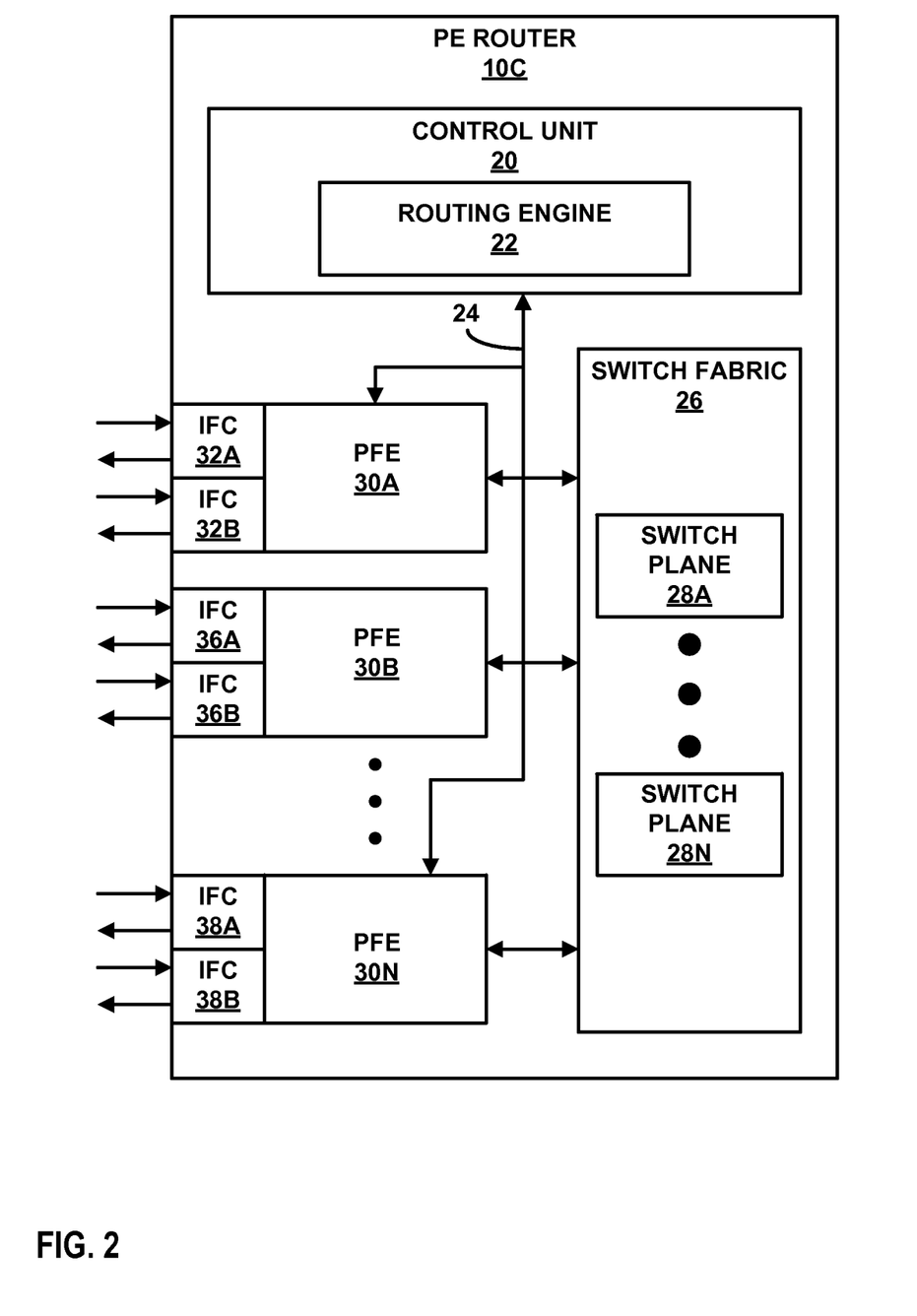
FIG. 2 is a block diagram illustrating the example PE router of FIG. 1 in greater detail, in accordance with techniques of the disclosure.

FIG. 2 is a block diagram illustrating example PE router 10C of FIG. 1 in greater detail, in accordance with techniques of the disclosure. PE router 10C includes control unit 20, switch fabric 26, and PFEs 30A-30N ("PFEs 30"), capable of implementing techniques of the disclosure. PFEs 30 may receive and send data via interface cards 32A-32B, 36A-36B, and 38A-38B ("IFCs 32", "IFCs 36", and "IFCs 38", respectively). In other embodiments, each of PFEs 30 may comprise more or fewer IFCs. Switch fabric 26 provides an interconnect mechanism for forwarding data between PFEs 30 for transmission over a network, e.g., the Internet.

Routing engine 22 maintains routing tables, executes routing protocols and controls user access to PE router 10C. In this example, routing engine 22 is connected to each of PFEs 30 by a dedicated link 24, which may be an internal Ethernet link. For example, dedicated link 24 may comprise a 100 Mbps Ethernet connection. Routing engine 22 maintains routing information that describes a topology of a network, and derives a forwarding information base (FIB) in accordance with the routing information. Routing engine 22 copies the FIB to each of PFEs 30. This allows the FIB in each of PFEs 30 to be updated without degrading packet forwarding performance of PE router 10C. Alternatively, routing engine 22 may derive separate FIBs which are copied to respective PFEs 30.

Control unit 20 provides an environment for storing L2 network topology information, e.g., spanning tree information, executing CFM protocols to provide fault isolation and detection over large L2 networks, and providing a management interface to allow user access and configuration of PE router 10C. The operating environment of control unit 20 may be implemented solely in software, or hardware, or may be implemented as a combination of software, hardware or firmware. For example, control unit 20 may include one or more processors which execute software instructions. In that case, control unit 20 may include various software modules or daemons, and may include a computer-readable storage medium, such as computer memory or hard disk, for storing executable instructions.

In a routing node, a "switch plane" is generally capable of providing a communication path between any two of PFEs 30. In this example, switch fabric 26 consists of multiple standalone switch planes 28A through 28N ("switch planes 28"). In some embodiments, each of switch planes 28 is provided by one or more switch fabric chips on one or more separate, removable switch cards. Other routing nodes that implement the techniques described herein may comprise additional or fewer switch planes, including a single switch plane. A majority of the switch planes may be active at any given time with data packets distributed over the active switch planes. The inactive switch plane(s) of switch fabric 26 serves as back-up switch plane(s) such that if one or more of the active switch planes goes offline, the back-up switch plane(s) automatically activate, and the bandwidth capacity of PE router 10C is not diminished. The back-up switch plane(s) may be identical to the active switch planes and act as hot spare(s) to maintain bandwidth capacity in the event that one or more of the active switch planes fail. Each of switch planes 28 is operationally independent; therefore, PE router 10C may continue to forward packets as long as at least one of switch planes 28 remain active, but possibly at a reduced bandwidth capacity.

As part of a standalone router, switch planes 28 form a standalone switch fabric 26. That is, each of switch planes 28 is capable of providing a connection between any of PFEs 30 within PE router 10C. In this manner, switch planes 28 form a standalone switch fabric that enables packet forwarding between the plurality of PFEs 30 of PE router 10C. For example, switch fabric 26 may be provided by a set of removable switch cards, where each removable switch card provides a respective one of switch planes 28.

In the example of FIG. 2, a network operator may provide user input that routing engine 22 uses to configure PE router 10C as part of an EVPN instance (EVI). The EVI may specify one or more Ethernet Segments, such as Ethernet Segments 14A-14B in FIG. 1. As part of the configuration, routing engine 22 determines a unique ESI for Ethernet Segment 14B, in which PE router 10C is singly-homed to CE router 8B. Routing engine 22 may send and receive one or more control messages with other PE routers 10 in the same EVI to determine a unique ESI for Ethernet Segment 14B.

Upon determining the ESI, routing engine 22 may send a route advertisement, such as an Auto-Discovery (AD) route advertisement for the ESI of Ethernet Segment 14B to other PE routers 10 in the same EVI, such as PE router 10D. Routing engine 22 may also configure one or more of PFEs 30 to associate the ESI of Ethernet Segment 14B with respective IFCs of the PFEs 30 that are coupled to network links in Ethernet Segment 14B. As described in FIG. 1 and further described in FIG. 3, routing engine 22 may perform MAC learning to learn MAC addresses of customer equipment included in customer network 6B. As routing engine 22 learns MAC addresses, routing engine may use BGP or other suitable L3 protocol to share MAC routes that include the MAC addresses with other PE routers 10 included in the same EVI. A MAC route advertisement may include the MAC address for customer equipment along with the ESI for the Ethernet Segment used to forward network packets to and from the customer equipment in service provide network 12. In this way, PE routers may maintain MAC tables that specify mappings of MAC addresses and corresponding ESIs, such that PE routers can unicast network packets rather than multicasting network packets to all neighboring PE routers.

PE router 10C may determine a link failure between PE router 10C and CE router 8B. For instance, a failure may occur at network link 16I. Responsive to determining the link failure, routing engine 22 may send a withdrawal message to PE router 10D, which is included in the same EVI as PE router 10C. The withdrawal message may be an AD route withdrawal message that is sent to PE router 10D as a route withdraw message using any suitable L3 routing protocol such as BGP. The AD route withdrawal message may cause PE router 10D to withdraw all of the plurality of MAC routes corresponding to Ethernet Segment 14B, which is identified by the ESI included in the AD route withdrawal message. PE router 10D may withdraw all of the MAC routes that it previously received from PE router 10C and which PE router 10C previously learned through MAC learning. In this way, in the event of a link failure, PE router 10C may send a single control plane message that causes PE router 10D to withdraw all of the MAC routes rather than sending multiple, per-MAC route withdrawal messages. Such techniques of the current disclosure may reduce the quantity of control plane messages sent by PE router 10C to PE router 10D in response to a link failure and/or improve network convergence times.

Figure 3:
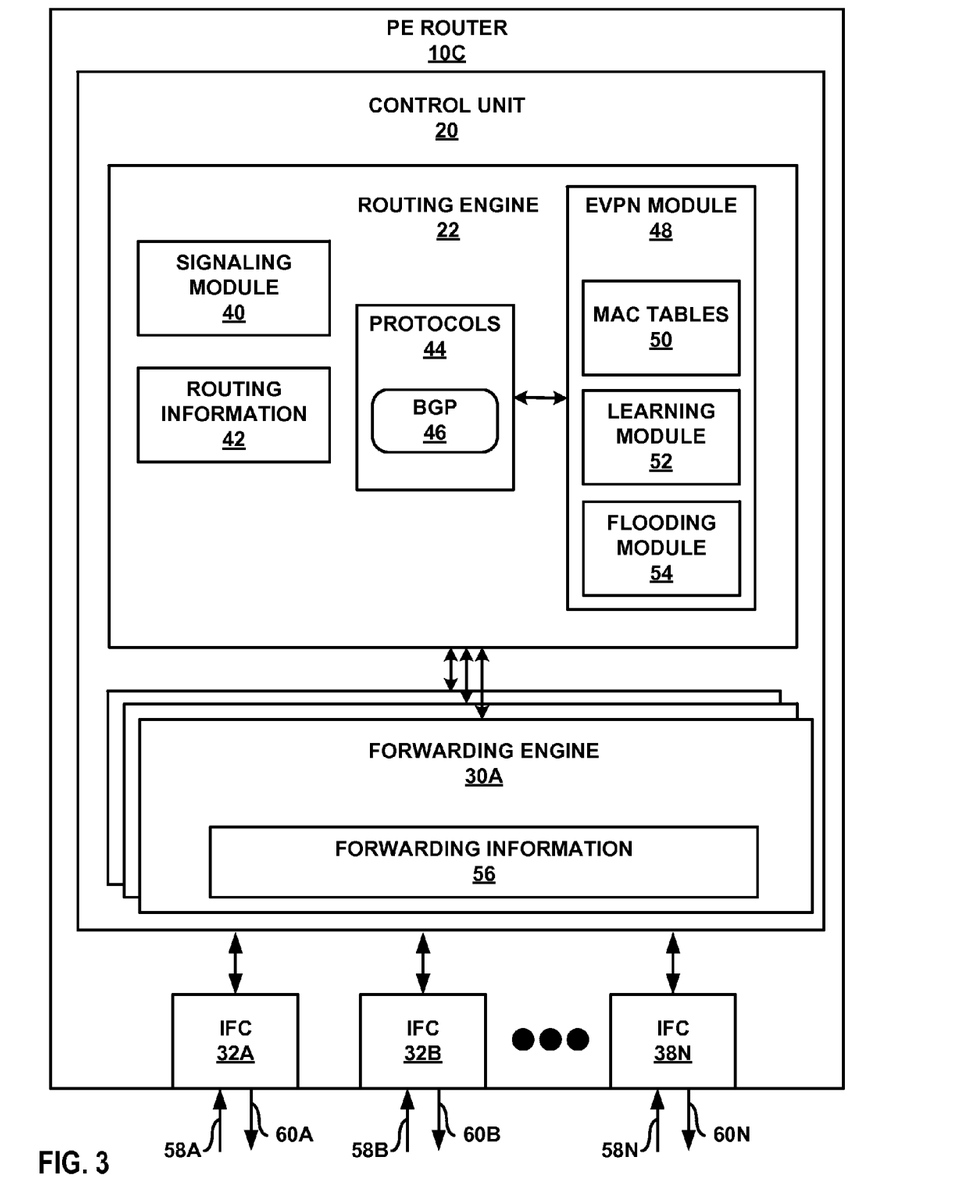
FIG. 3 is a block diagram illustrating further details of a PE router that uses a single route withdrawal message to perform a mass withdrawal of Media Access Control (MAC) routes, in accordance with techniques of the disclosure.

FIG. 3 is a block diagram illustrating further details of provider edge (PE) router 10C that uses a single route withdrawal message to perform a mass withdrawal of Media Access Control (MAC) routes, in accordance with techniques of the disclosure. PE router 10C includes a control unit 20 that includes a routing engine 22 coupled to a forwarding engine 30A-30N. PE router 10C includes interface cards 32A-38N ("IFCs 38") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Routing engine 22 provides an operating environment for various protocols 44 that execute at different layers of a network stack. The protocols may be software processes executing on one or more processors. For example, routing engine 22 includes network protocols that operate at a network layer of the network stack. In the example of FIG. 3, network protocols include the Border Gateway Protocol (BGP) 46, which is a routing protocol. Routing engine 22 may include other protocols not shown in FIG. 3. Routing engine 22 is responsible for the maintenance of routing information 42 to reflect the current topology of a network and other network entities to which PE router 10C is connected. In particular, routing protocols periodically update routing information 42 to accurately reflect the topology of the network and other entities based on routing protocol messages received by PE router 10C.

Forwarding engines 30A-30N ("forwarding engines 30") represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE router 10C receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 3, forwarding engine 30A includes forwarding information 56. In accordance with routing information 42, forwarding engine 30A maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

Forwarding engine 30A maintains forwarding information 56 for each Ethernet Virtual Instance (EVI) established by PE router 10C to associate network destinations with specific next hops and the corresponding interface ports. As described an FIG. 1, an EVI may define one or more Ethernet Segments in an EVPN. In general, when PE router 10C receives a data packet on an LSP of a given EVI via one of inbound links 58, forwarding engine 30A, for example, identifies an associated next hop for the data packet by traversing forwarding information 56 based on information (e.g., labeling information) within the packet. Forwarding engine 30A forwards the data packet on one of outbound links 60 to the corresponding next hop in accordance with forwarding information 56 associated with the EVI. At this time, forwarding engine 30A may push and/or pop labels from the packet to forward the packet along a correct LSP.

Control unit 42 also includes an EVPN module 48 having flooding module 54 that performs flooding and a learning module 52 that performs layer two (L2) learning, e.g., learning of customer device MAC addresses from inbound PWs and association of those customer MAC addresses with corresponding outbound PWs and output interfaces. EVPN module 48 may maintain MAC tables 50 for each EVI established by PE router 10C, or in alternative examples may maintain one or more MAC tables that are independent of each respective EVI. Learning module 52 and flooding module 54 may alternatively reside within forwarding engine 45.

Signaling module 40 outputs control-plane messages to automatically establish LSPs, Ethernet Segments, and otherwise provision one or more EVPNs between PE router 10C and each of the other PE routers 10. Signaling module 40 may signal the PE routers 10 using one or more suitable L3 protocols, such as the BGP. Signaling module 40 can communicate with forwarding engine 30A to automatically update forwarding information 56.

EVPN module 48 executes in the control plane of PE router 10C and performs MAC address learning to automatically update portions of forwarding information 56 for each EVI established by PE router 10C. EVPN module 48 is invoked when PE router 10C receives data packets on the LSPs established by router PE router 10C for any of the PE routers 10 that are members of an EVI. EVPN module 48 performs MAC address learning using learning module 52 and updates the one of MAC tables 50 to initially record associations between the PWs connected to PE router 10C and the source MAC addresses of the EVPN customer devices from which the data packets were received on the PWs. For example, the one of MAC tables 50 records PW numbers that identify the PWs connected to PE router 10C, and records MAC addresses that identify the source customer devices of the data packets transmitted over the PWs. In effect, router PE router 10C, an L3 routing device (or in some examples, an L2 switching device), learns associations between MAC addresses and LSPs, much as an L2 switch learns associations between MAC addresses and ports. Forwarding information 56 may represent a virtual port binding and bridging table.

In order to update the one of the MAC tables 50, learning module 52 of EVPN module 48 in routing engine 22 performs L2 learning and association of L2 customer MAC addresses with specific PWs. Learning module 52 then communicates information recorded in the one of MAC tables 50 to configure forwarding information 56. In this way, forwarding engine 30A may be programmed with associations between each PW and output interface and specific source customer MAC addresses reachable via those PWs. EVPN module 48 may communicate with forwarding engines 30 to update the one of MAC tables 50 associated with the EVPN to associate the customer MAC addresses with the appropriate outbound PW. In some examples, forwarding engine 30A may maintain local MAC tables (not shown). After the update, MAC tables 50 include associations between the PWs connected to PE router 10C that are used to transport L2 traffic to the MAC addresses of the customer devices. In other words, MAC tables 50 records associations between the PWs and the network devices to which data packets may be sent on the PWs. For example, MAC tables 50 may record PW numbers that identify the PWs sourced by PE router 10C, and for those PW numbers identifies the MAC addresses of the reachable customer devices.

Forwarding engine 30A receives data packets on inbound links 58 that are destined for one of the PE routers in the EVPN. Forwarding engine 30A determines whether the destination customer MAC address of the data packets is included in the one of MAC tables associated with the EVPN. If the MAC address is included in the one of MAC tables, then PE router 10C forwards the data packets to the destination PE router on the PW associated with the MAC address based on forwarding information 56 associated with the EVPN. If the customer MAC address is not included in the one of MAC tables, PE router 10C floods the data packets to all of the PE routers via the PWs based on forwarding information 56 associated with the EVPN. Example details of MAC learning by a router are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

In some examples, techniques of the present disclosure may be implemented in EVPN module 48. For instance, at initial configuration and startup, a network operator may provide one or more user inputs to PE router 10C via a user interface. The user input may be used by EVPN module 48 to configure an EVI that includes Ethernet Segment 14B as shown in FIG. 1 in which PE router 10C is singly homed to CE router 8B. EVPN module 48 may receive the user input initially and determine an ESI that identifies Ethernet Segment 14B. In some examples, EVPN module 48 initiates communication with one or more of PE routers 10 to determine a unique ESI that has not yet been assigned to any other Ethernet Segment.

Upon determining the ESI, EVPN module 48 may generate an AD route advertisement. The AD route advertisement may be a message structured in accordance with BGP that includes the information indicated in Table 1:

TABLE 1

| AD route advertisement |
| --- |
| Route Descriptor (8 octets)<br>Ethernet Segment Identifier (10 octets)<br>Ethernet Tag ID (4 octets)<br>MPLS Label (3 octets) |

BGP 46 sends the AD route advertisement using BGP to one or more of PE routers 10 included in the EVI, which in the example of FIG. 1 includes PE router 10D. In addition to sending the AD route advertisement, EVPN configures routing information 42 to indicate the ESI corresponding to Ethernet Segment 14B. Routing engine 22 may further configure forwarding information 56 to include the ESI corresponding to Ethernet Segment 14B based on routing information 42.

As EVPN module 48 performs MAC learning, for example using local and/or remote learning, PE router 10C may share MAC routes with neighboring PE routers. In some examples, PE router 10C shares MAC routes with other PE routers in the same EVI. In any case, EVPN module 48 may, upon learning a MAC address, generate a routing protocol message (e.g., BGP message or other suitable L3 protocol message) to advertise one or more MAC routes. A MAC route advertisement may be a message structured in accordance with BGP that includes the information indicated in Table 2:

TABLE 2

| MAC Advertisement Route |
| --- |
| Route Descriptor (8 octets)<br>Ethernet Segment Identifier (10 octets)<br>Ethernet Tag ID (4 octets)<br>MAC Address Length (1 octet)<br>MAC Address (6 octets)<br>IP Address Length (1 octet)<br>IP Address (4 or 16 octets)<br>MPLS Label (3 octets) |

As shown in MAC route advertisement structure of Table 2, a MAC address learned by EVPN module 48 has a corresponding ESI. When an Ethernet Frame is received by a PE router that has received the MAC route advertisement, the PE router may simply forward the Ethernet Frame to the next hop that is included in the Ethernet Segment identified by the ESI of the MAC route. Upon generating a MAC route advertisement, PE router 10C sends the MAC route advertisement to one or more PE routers. The one or more PE routers may, in turn, store associations between the MAC addresses and ESIs indicated by the advertised MAC routes.

EVPN module 48 may also configure routing information 42 to indicate ESIs that correspond, respectively, to MAC addresses learned by PE router 10C. That is, EVPN module 48 may configure routing information 42 to associate the ESI with at least one MAC address included in the one or more MAC routes that are learned by PE router 10C and shared with one or more of PE routers 10. In particular, EVPN module 48 may configure routing information 42 to associate one or more of IFCs 32 with one or more respective MAC addresses learned by PE router 10C. In addition, EVPN module 48 may configure routing information 42 to associate a MAC address with an ESI of an Ethernet Segment through which the MAC address is reachable using PE router 10C.

Routing engine 22 may configure forwarding information 56 of forwarding engine 30A in accordance with routing information 42. In particular, routing engine 22 may configure forwarding information 56, such that forwarding next hops in forwarding engine 30A are updated to forward a received Ethernet Frame to a single egress IFC that corresponds to an associated, learned MAC address rather than flooding the Ethernet Frame out of all of IFCs 32. Consequently, routing engine 22 may configure at least one packet forwarding engine to use an interface that is associated with the ESI to forward network packets matching the at least one MAC address included in the one or more MAC routes that are learned by PE router 10C and shared with one or more of PE routers 10.

In accordance with techniques of the disclosure, forwarding engine 30A may determine a link failure at network link 16I between PE router 10C and CE router 8B. For instance, forwarding engine 30A may determine that IFC 32A, which may be the interface that couples to network link 16I, is no longer able to send and/or receive network packets. Consequently, forwarding engine 30A may send data to routing engine 22 that indicates the link failure. In particular, the data may identify IFC 32A. EVPN module 48 may receive the data initially from forwarding engine 30A that indicates the link failure corresponding to IFC 32A.

In response to receiving the data indicating the link failure, EVPN module 48 determines the ESI corresponding to IFC 32A. In some examples, EVPN module 48 may store such information in MAC tables 48, which may indicate associations between MAC addresses, ESIs, and IFCs. Upon determining the ESI corresponding to IFC 32A, EVPN module 48 may indicate the ESI to BGP 46. BGP 46 may include a daemon send and receive BGP formatted messages. BPG 46 may generate an AD route withdrawal advertisement that includes the ESI determined by EVPN module 48 and which corresponds to IFC 32A. The AD route withdrawal message may be generated in accordance with the BGP standard.

EVPN module 48 may determine one or more of PE routers 10 that are included in the same EVI. That is, EVPN module 48 may determine a plurality of provider edge network devices that are each included in a common EVPN instance with the first provide edge network device, wherein the common EVPN instance specifies the layer two segment of the EVPN. EVPN module 48 may generate an AD route withdrawal advertisement for each of PE routers 10 included in the EVI that specifies Ethernet Segment 14B corresponding to the ESI. BGP 46 may send an AD route withdrawal advertisement for each of the PE routers forwarding engines 30. Each of the AD route withdrawal advertisements may include packet header information to identify each of the destination PE routers. Forwarding engines 30, upon receiving the AD route withdrawal advertisements may forward to the advertisements to the respective PE routers using IFCs 32 that correspond to the packet header information. For instance, forwarding engines 30 may send, using a layer three (L3) routing protocol, an instance of the withdrawal message to each of the plurality of provider edge network devices for the route associated with the segment identifier to withdraw all of the plurality of MAC routes at each respective provided edge network device of the plurality of provider edge network devices. In this way, PE router 10C uses BGP to send AD route withdrawal advertisements to corresponding PE routers in the EVI that specifies Ethernet Segment 14B. EVPN module 48 may also flush MAC tables 60 to remove MAC addresses corresponding to the ESI specified in the AD route withdrawal advertisements.

As shown in FIG. 1, PE router 10D may be configured in the same EVI as PE router 10C to use Ethernet Segment 14B to forward network packets CE router 8B. PE router 10D, upon receiving the AD route withdrawal advertisement, may perform a mass withdrawal of all MAC routes associated with the ESI included in the AD route withdrawal message. For instance, PE router 10D may flush all MAC addresses from its MAC tables that are associated with the ESI. In this way, PE router 10D can update its forwarding information to reroute network packets along a different route to CE router 8B. Moreover, by sending a single AD route withdrawal advertisement, PE router 10C need not send per-MAC route withdrawals to PE router 10D in some examples, thus reducing control plane messaging and/or improving network convergence times in the event of a link failure.

The techniques described herein do not require modifications to BGP signaling for the EVPN. If a PE router configured as described herein encounters another PE router that does not support this feature, the configured PE router operates according to the conventional operation. The architecture of PE router 10C illustrated in FIG. 3 is shown for exemplary purposes only. The disclosure is not limited to this architecture. In other embodiments, PE router 10C may be configured in a variety of ways. In one embodiment, for example, some of the functionally of routing engine 22 and forwarding engines 30 may be distributed within IFCs 32.

Elements of control unit 20 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10C, e.g., protocols. Control unit 20, in some examples, retrieves and executes the instructions from memory for these aspects.

Figure 4:
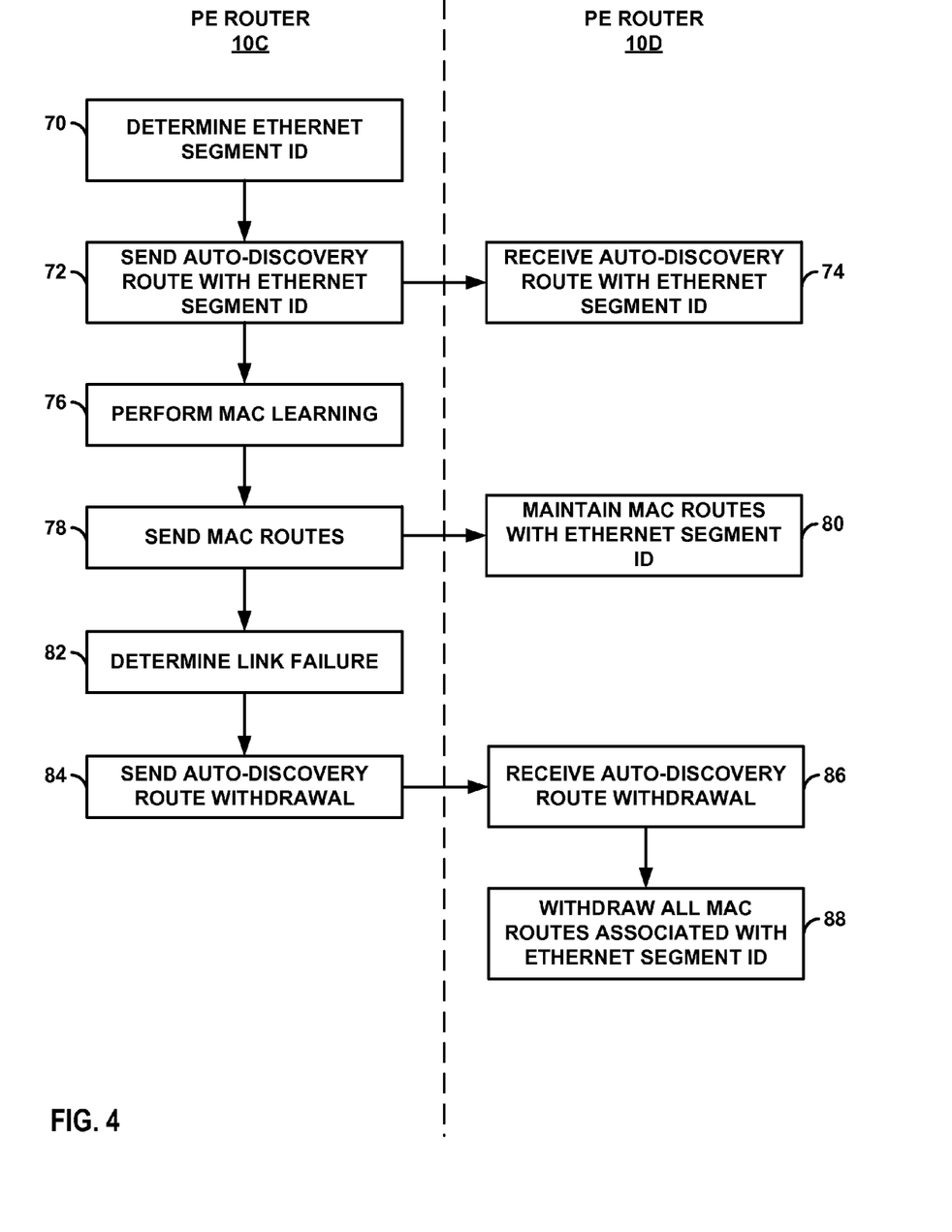
FIG. 4 is a flowchart illustrating example operations of multiple network devices using a single route withdrawal message to perform a mass withdrawal of MAC routes responsive to a link failure, in accordance with techniques of the disclosure.

FIG. 4 is a flowchart illustrating example operations of multiple network devices using a single route withdrawal message to perform a mass withdrawal of MAC routes responsive to a link failure, in accordance with techniques of the disclosure. Example operations in accordance with techniques of the disclosure are illustrated for example purposes with respect to PE router 10C and PE router 10D. As shown in FIG. 4, PE router 10C may, at initial configuration and startup, determine an ESI for the singly-homed Ethernet Segment (70). That is, as shown in FIG. 1, PE router 10C may be singly-homed to CE router 8B in Ethernet Segment 14B. PE router 10C may send an AD route advertisement to PE router 10D that includes the ESI previously determined by PE router 10C (72).

PE router 10D receives the AD route advertisement that includes the ESI that identifies Ethernet segment 14B (74). PE router 10D may configure its routing information and forwarding information to store the ESI. PE router 10C may also perform MAC learning as previously described in this disclosure, for example, performing local and/or remote MAC learning (76). PE router 10C may maintain a table or other suitable data structure that includes MAC addresses of devices determined through MAC learning. PE router 10C may also store associations between MAC addresses and ESIs that correspond to Ethernet Segments used to forward network traffic from the respective devices associated with the MAC addresses.

PE router 10C sends MAC routes to PE router 10D as part of the MAC learning process that occurs between PE router 10C and PE router 10D (78). To share a MAC route, PE router 10C may send a MAC route advertisement that includes a MAC address and ESI corresponding to the Ethernet Segment used to forward network packets to the MAC address. PE router 10D may receive the MAC route advertisement and maintain information that indicates the association between the MAC address and ESI in a MAC table or other suitable data structure. PE router 10D may use the learned MAC route to forward network traffic to, for example CE router 8B, using the Ethernet Segment identified by the ESI that is associated with the MAC address in the MAC table.

In some examples, PE router 10C may determine a link failure or other impediment to network communication has occurred, for example, between PE router 10C and CE router 8B (82). Responsive to determining that a failure has occurred, PE router 10C may determine which MAC routes are affected by the failure. For instance, PE router 10C may determine the one or more interfaces of PE router 10C associated with the link failure that correspond to MAC addresses maintained in the MAC table of PE router 10C. PE router 10C may determine the ESI associated with the MAC addresses that correspond to interfaces associated with the link failure.

Rather than sending per-MAC route withdrawal messages to PE router 10D, PE router 10C may send a single AD route withdrawal advertisement that indicates the ESI associated with the MAC addresses that correspond to interfaces associated with the link failure (84). PE router 10D may receive the AD route withdrawal advertisement (86). PE router 10D determines the ESI associated with the AD route withdrawal advertisement and withdraws all of the MAC routes associated with the ESI (88). In this way, in the event of a link failure, PE router 10D may receive a single AD route withdrawal advertisement to perform a mass withdraw of all MAC addresses associated with the ESI. In some examples, PE router 10D may flush its MAC table to remove information indicating associations between the ESI and the MAC routes. In some examples, PE router 10D may update its forwarding next hops for the MAC routes in order to redirect traffic through one or more different network paths.

Figure 5:
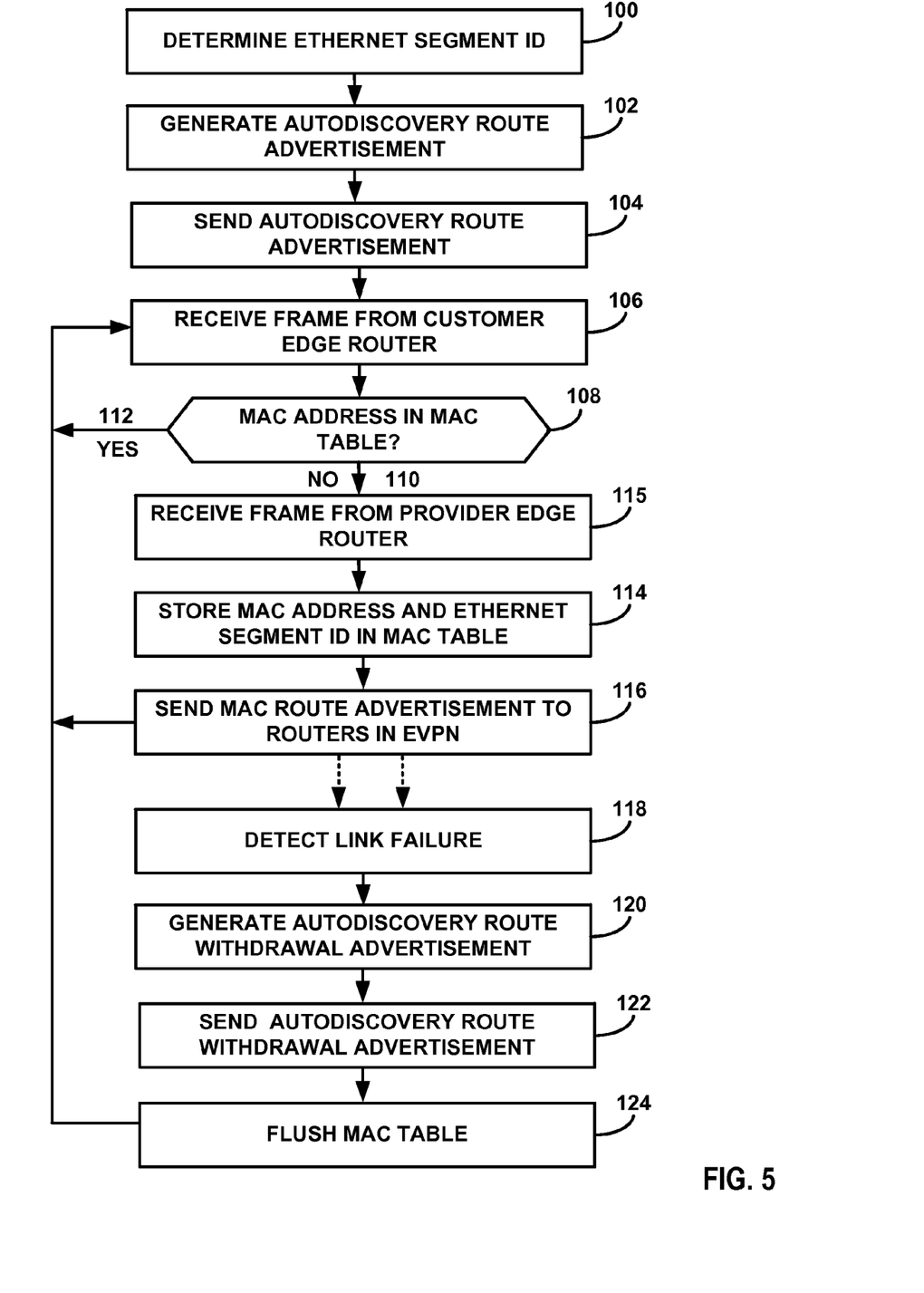
FIG. 5 is a flowchart illustrating example operations of a network device to use a single route withdrawal message to perform a mass withdrawal of MAC routes in a PE network device of a singly-homed L2 segment in an EVPN, in accordance with techniques of the disclosure.

FIG. 5 is a flowchart illustrating example operations of a network device to use a single route withdrawal message to perform a mass withdrawal of MAC routes in a PE network device of a singly-homed L2 segment in an EVPN, in accordance with techniques of the disclosure. Initially, during configuration and startup, PE device 10C, which is singly-homed to CE router 4B, determines an Ethernet Segment Identifier (ESI) for the Ethernet Segment that includes PE device 10C (100). PE router 10C generates an AD route advertisement that includes the ESI (102) and sends the AD route advertisement to PE router 10D.

PE router 10C also performs MAC learning to forward network traffic as described in FIGS. 1-4. For instance, PE router 10C receives an Ethernet frame CE router 4B (106). PE router 10C determines whether the MAC address of the Ethernet frame matches one or more entries in a MAC table maintained by PE router 10C (108). If the MAC address of the Ethernet frame matches a MAC address included in the MAC table of PE router 10C, then PE router 10C forwards the Ethernet frame to a neighboring PE router using an interface associated with the matching MAC address in the MAC table and continues processing subsequent Ethernet frames (112).

In some examples, PE router 10C determines that the MAC address of the Ethernet Frame is not included in the MAC table of PE router 10C (110). PE router 10C may multicast the Ethernet frame to one or more neighboring PE routers of PE routers 10C. PE router 10C may subsequently receive an Ethernet frame from one of the neighboring PE routers 10C that matches the MAC address (115). PE router 10C may store information in the MAC table of PE router 10C that indicates, for example the MAC address, ESI for the Ethernet Segment and/or the ingress interface at which PE router 10C received the Ethernet frame from PE router 10D, for example. (114). PE router 10C may unicast subsequent Ethernet frames from CE router 4B to PE router 10D using the information stored in the MAC table.

While PE router 10C is forwarding Ethernet frames, PE router 10C may detect a link failure or other impediment to network communication at network link 16I (118). Responsive to determining the link failure, PE router 10C generates an AD route withdrawal advertisement for the Ethernet Segment that includes the link failure (122). Upon generating the route withdrawal advertisement PE router 10C sends the AD route withdrawal advertisement to PE routers, such as PE router 10D (122). PE router 10D may use the AD route withdrawal advertisement to withdraw all MAC routes corresponding to the ESI indicated in the AD route withdrawal advertisement. PE router 10C may also flush its MAC table to remove previously learned MAC addresses that were reachable using link 16I in Ethernet Segment 14B.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
   determining, by a first provider edge network device to which a customer edge network device is singly-homed in a layer two segment of an Ethernet Virtual Private Network (EVPN), a segment identifier of the layer two segment;
   sending, by the first provider edge network device and using a layer three (L3) routing protocol, a route advertisement to advertise a route for the segment identifier to a second provider edge network device included in the EVPN;
   sending, by the first provider edge network device and to the second provider edge network device using the layer three L3 routing protocol, a route advertisement to advertise one or more media access control (MAC) routes for the layer two segment, wherein each of the MAC routes specifies at least one MAC address reachable through the customer edge network that is singly-homed to the first provider edge network device;
   responsive to determining a link failure between the first provider edge network device and the customer edge network device:
      flushing, by the first provider edge network device, one or more MAC routes associated with the segment identifier that were previously learned by the first provider edge network device;
      sending, by the first provider edge network device and using the L3 routing protocol, a withdrawal message to the second provider edge network device for the route associated with the segment identifier to withdraw all of the plurality of MAC routes at the second provider edge network device, wherein the segment identifier corresponds to the one or more MAC routes maintained by the second provider edge network device that were previously learned by the first provider edge router; and
      learning, by the first provider edge network device and after flushing the one or more MAC routes, a new MAC route associated with the segment identifier.

2. The method of claim 1, further comprising:
   receiving, by the first provider edge network device, a network packet;
   identifying, by the first provider edge network device, a MAC address corresponding to customer equipment included in a customer edge network, the first provider edge router being operatively coupled to the customer edge network;
   updating, by the first provider edge network device, routing information of the first provider edge network device to associate the MAC address with the segment identifier; and
   configuring, by the first provider edge network device and based at least in part on the routing information, forwarding information of at least one packet forwarding engine of the first provider edge network device.

3. The method of claim 2, wherein configuring the forwarding information of the at least one packet forwarding engine further comprises:
   configuring, by the first provider edge network device, the at least one packet forwarding engine to use an interface that is associated with the segment identifier to forward network packets matching the MAC address.

4. The method of claim 1, wherein the withdrawal message is an Auto-Discovery route withdrawal advertisement, the method further comprising:
   generating, by the first provider edge network device, the Auto-Discovery route advertisement withdrawal comprising the segment identifier of the layer two segment.

5. The method of claim 1, wherein the route advertisement to advertise a route for the segment identifier is an Auto-Discovery route advertisement, the method further comprising:
   generating, by the first provider edge network device, the Auto-Discovery route advertisement comprising the segment identifier of the layer two segment.

6. The method of claim 1, wherein the L3 routing protocol comprises Border Gateway Protocol.

7. The method of claim 1, further comprising:
   determining, by the first provider edge network device, a plurality of provider edge network devices that are each included in a common EVPN instance with the first provide edge network device, wherein the common EVPN instance specifies the layer two segment of the EVPN; and
   sending, by the first provider edge network device and using the L3 routing protocol, an instance of the withdrawal message to each of the plurality of provider edge network devices for the route associated with the segment identifier to withdraw all of the plurality of MAC routes at each respective provided edge network device of the plurality of provider edge network devices.

8. The method of claim 1, further comprising:
   receiving, by the second provider edge network device and from the first provider edge network device to which the customer edge network device is singly-homed in the layer two segment of the EVPN and using the L3 routing protocol, the route advertisement that advertises the route that indicates the first provider edge network device is reachable in the layer 2 segment identified by the segment identifier;
   receiving, by the second provider edge network device and from the first provider edge network device and using the L3 routing protocol, the route advertisement that advertises one or more MAC routes for the layer two segment, wherein each of the MAC routes specifies at least one a MAC address reachable through the customer edge network that is singly-homed to the first provider edge network device;

updating, by the second provider edge network device, forwarding information of the second provider edge network device to associate the one or more MAC routes with the segment identifier; and responsive to receiving, by the second provider edge network device and from the first provider edge network device using the L3, the withdrawal message that indicates the segment identifier, flushing, by the second provider edge network device, all of the plurality of MAC routes at the second provider edge network device associated with the segment identifier, wherein the segment identifier corresponds to MAC routes maintained by the second provider edge network device that were previously learned by the first provider edge router.

9. A network device, wherein the network device is a first provider edge network device, comprising:

an Ethernet Virtual Private Network (EVPN) module that determines, by the first provider edge network device to which a customer edge network device is singly-homed in a layer two segment of an EVPN, a segment identifier of the layer two segment;

wherein the EVPN module sends, using a layer three (L3) routing protocol, a route advertisement to advertise a route for the segment identifier to a second provider edge network device included in the EVPN;

wherein the EVPN module sends, to the second provider edge network device using the layer three L3 routing protocol, a route advertisement to advertise one or more media access control (MAC) routes for the layer two segment, wherein each of the MAC routes specifies at least one MAC address reachable through the customer edge network that is singly-homed to the provider edge network device; and wherein the EVPN module, responsive to determining a link failure between the first provider edge network device and the customer edge network device, sends, using the layer three L3 routing protocol, a withdrawal message to the second provider edge network device for the route associated with the segment identifier to withdraw all of the plurality of MAC routes at the second provider edge network device, wherein the segment identifier corresponds to the one or more MAC routes maintained by the second provider edge network device that were previously learned by the first provider edge router.

10. The network device of claim 9, comprising a network interface that receives a network packet;

wherein the EVPN module identifies a MAC address corresponding to customer equipment included in a customer edge network, the first provider edge router being operatively coupled to the customer edge network;

wherein the EVPN module updates routing information of the first provider edge network device to associate the MAC address with the segment identifier;

wherein the EVPN module configures, based at least in part on the routing information, forwarding information of at least one packet forwarding engine of the first provider edge network device.

11. The network device of claim 10, wherein the EVPN module configures the at least one packet forwarding engine to use an interface that is associated with the segment identifier to forward network packets matching the MAC address.

12. The network device of claim 9, wherein the withdrawal message is an Auto-Discovery route withdrawal advertisement, and wherein the EVPN module configures generates the Auto-Discovery route advertisement withdrawal comprising the segment identifier of the layer two segment.

13. The network device of claim 9, wherein the route advertisement to advertise a route for the segment identifier is an Auto-Discovery route advertisement, and wherein the EVPN module generates the Auto-Discovery route advertisement comprising the segment identifier of the layer two segment.

14. The network device of claim 9, wherein the L3 routing protocol comprises Border Gateway Protocol.

15. The network device of claim 9, wherein the EVPN module determines a plurality of provider edge network devices that are each included in a common EVPN instance with the first provide edge network device, wherein the common EVPN instance specifies the layer two segment of the EVPN; and wherein the network device comprises a network interface sends an instance of the withdrawal message to each of the plurality of provider edge network devices for the route associated with the segment identifier to withdraw all of the plurality of MAC routes at each respective provided edge network device of the plurality of provider edge network devices.

16. The network device of claim 9, wherein the EVPN module flushes one or more MAC routes associated with the segment identifier that were previously learned by the provider edge network device; and wherein the EVPN module learns, after flushing the one or more MAC routes, a new MAC route associated with the segment identifier.

17. A method comprising:

receiving, by a first provider edge network device and from a second provider edge network device to which a customer edge network device is singly-homed in a layer two segment of an Ethernet Virtual Private Network (EVPN), a layer 3 (L3) route advertisement that advertises a route that indicates the second provider edge network device is reachable in the layer 2 segment identified by a segment identifier;

receiving, by the first provider edge network device and from the second provider edge network device, a L3 route advertisement that advertises a media access control (MAC) route for the layer two segment, wherein the MAC routes specifies a MAC address reachable through the customer edge network that is singly-homed to the second provider edge network device;

updating, by the first provider edge network device, forwarding information of the first provider edge network device to associate the MAC route with the segment identifier; and responsive to receiving, by the first provider edge network device and from the second provider edge network device, a L3 route withdrawal message that indicates the segment identifier, flushing, by the first provider edge network device, all MAC routes at the first provider edge network device associated with the segment identifier, wherein the segment identifier corresponds to MAC routes maintained by the first provider edge network device that were previously learned by the second provider edge router.

18. The method of claim 17, further comprising:
receiving, by a third provider edge network device and after flushing the MAC routes, a layer 3 route advertisement that advertises a MAC route for the layer two segment; and
updating, by the first provider edge network device, forwarding information of the first provider edge network device to associate the MAC address with the segment identifier.

19. The method of claim 17, further comprising:
determining, by the second provider edge network device to which the customer edge network device is singly-homed in the layer two segment of the EVPN, the segment identifier of the layer two segment;
sending, by the second provider edge network device and using a layer three (L3) routing protocol, the route advertisement to advertise the route for the segment identifier to the second provider edge network device included in the EVPN;
sending, by the second provider edge network device and to the first provider edge network device using the layer three routing protocol, the route advertisement to advertise the MAC route for the layer two segment, wherein the MAC route specifies a MAC address reachable through the customer edge network that is singly-homed to the second provider edge network device; and
responsive to determining a link failure between the second provider edge network device and the customer edge network device, sending, by the second provider edge network device and using the layer three routing protocol, the L3 withdrawal message to the first provider edge network device for the route associated with the segment identifier to withdraw all the MAC routes at the first provider edge network device, wherein the segment identifier corresponds to MAC routes maintained by the first provider edge network device that were previously learned by the second provider edge router.

20. A network device, wherein the network device is a first provider edge network device, comprising:
an Ethernet Virtual Private Network (EVPN) module that receives, from a second provider edge network device to which a customer edge network device is singly-homed in a layer two segment of an EVPN, a layer 3 (L3) route advertisement that advertises a route that indicates the second provider edge network device is reachable in the layer 2 segment identified by a segment identifier;
wherein the EVPN module receives, from the second provider edge network device, a L3 route advertisement that advertises a media access control (MAC) route for the layer two segment, wherein the MAC routes specifies a MAC address reachable through the customer edge network that is singly-homed to the second provider edge network device;
wherein the EVPN module updates forwarding information of the first provider edge network device to associate the MAC route with the segment identifier; and
wherein the EVPN module, responsive to receiving from the second provider edge network device a L3 route withdrawal message that indicates the segment identifier, flushes all MAC routes at the first provider edge network device associated with the segment identifier, wherein the segment identifier corresponds to MAC routes maintained by the first provider edge network device that were previously learned by the second provider edge router.

21. The network device of claim 20,
wherein the network device comprises a network interface that receives, by a third provider edge network device and after flushing the MAC routes, a layer 3 route advertisement that advertises a MAC route for the layer two segment; and
wherein the EVPN module forwards information of the first provider edge network device to associate the MAC address with the segment identifier.

\* \* \* \* \*